United States Patent [19]

Kipp

[11] Patent Number: 5,239,167
[45] Date of Patent: Aug. 24, 1993

[54] CHECKOUT SYSTEM

[76] Inventor: Ludwig Kipp, 235 Dunbar Rd., Palm Beach, Fla. 33480

[21] Appl. No.: 694,009

[22] Filed: Apr. 30, 1991

[51] Int. Cl.$^5$ .............................................. G06K 15/00
[52] U.S. Cl. ..................................... 235/383; 235/375; 235/385
[58] Field of Search ............... 235/383, 382, 384, 462, 235/463, 375, 385; 340/551, 572; 186/61, 64; 364/403

[56] References Cited

U.S. PATENT DOCUMENTS

| | | | |
|---|---|---|---|
| 2,919,851 | 1/1960 | Otis | 235/61.9 |
| 3,637,989 | 1/1972 | Howard et al. | 235/383 |
| 4,084,742 | 4/1978 | Silverman | 235/383 |
| 4,567,361 | 1/1986 | Rosenthal | 235/462 |
| 4,583,083 | 4/1986 | Bogasky | 340/572 |
| 4,623,877 | 11/1986 | Buckens | 340/572 |
| 4,652,863 | 3/1987 | Hultman | 340/551 |
| 4,673,932 | 6/1987 | Ekchian et al. | 364/478 |
| 4,745,401 | 5/1988 | Montean | 340/572 |
| 4,779,706 | 10/1988 | Morgenthaler | 235/383 |
| 4,792,018 | 12/1988 | Humble et al. | 235/383 |
| 4,870,391 | 9/1989 | Cooper | 340/572 |
| 4,891,755 | 1/1990 | Asher | 235/383 |
| 4,909,356 | 3/1990 | Rimondi et al. | 235/383 |
| 4,940,116 | 7/1990 | O'Connor et al. | 235/383 |
| 4,962,369 | 10/1990 | Close | 340/572 |
| 4,964,053 | 10/1990 | Humble | 235/383 |
| 4,980,544 | 12/1990 | Winter | 235/462 |
| 5,005,125 | 4/1991 | Farrar et al. | 364/403 |
| 5,083,638 | 1/1992 | Schneider | 235/383 |

FOREIGN PATENT DOCUMENTS

| | | |
|---|---|---|
| 0355355 | 2/1990 | European Pat. Off. . |
| 2555339 | 5/1985 | France . |
| 9000785 | 1/1990 | France . |
| 9016049 | 12/1990 | France . |

Primary Examiner—Eugene R. LaRoche
Assistant Examiner—Tan Nguyen
Attorney, Agent, or Firm—Amster, Rothstein & Ebenstein

[57] ABSTRACT

A system for operator-unassisted checkout of randomly disposed articles in a container in a checkout area of a supermarket or the like, performed without contacting the articles in the container, includes, associated with each article, respective transmitters for transmitting product-identifying data upon actuation and then deactuating itself. Associated with the checkout area are actuators for actuating all of the transmitters in the container and a receiver for receiving the transmitted product-identifying data from each article in the container in turn and identifying the total cost of the articles in the container.

10 Claims, 1 Drawing Sheet

CHECKOUT SYSTEM

BACKGROUND OF THE INVENTION

The present invention relates to checkout systems, and in particular to an operator-unassisted checkout of randomly disposed articles in a container in a checkout area of a supermarket or the like, performed without directly contacting the articles in the container.

Since U.S. Pat. No. 2,919,851, there have been a variety of checkout systems Patented with the intention of automating and speeding up the checkout system used in supermarkets, department stores, and the like. To the extent that such a checkout system can be automated and operator assistance dispensed with (except in unusual cases where the unassisted procedure for one reason or another goes awry), there exists a vast potential for reduced labor costs. To the extent that such an automated system can operate faster than a manual system, the store profits by requiring fewer checkout lanes and the customer profits from a faster checkout. Other advantages likewise flow from an automated checkout system, including greater accuracy, better inventory control, and the like.

The aforesaid U.S. Pat. No. 2,919,851 discloses two embodiments of an automated checkout system. In one embodiment, a tag associated with each article must be manually placed in a card reader so as to communicate the requisite information contained on the tag to the checkout system. Such a serial manual handling of the articles to be purchased leads to a slow and laborious checkout process, whether performed by the customer or by a store employee. In a second embodiment, however, the articles containing the tags are simply placed promiscuously in a container (such as a checkout cart), and the system utilizes a shadow detector unit to enable reading of the tags. If some of the tags are not in a proper disposition for reading by the shadow detector unit, the container must be repositioned as many times as necessary so that all of the tags are at one time or another properly disposed for reading. In the event that there is some inconsistency noted by the system (for example, perhaps because one tag had not been read), a store employee must be consulted to determine which of the various articles in the container were not properly read.

Accordingly, it is an object of the present invention to provide a system for operator-unassisted checkout of randomly disposed articles in a container at a checkout area.

Another object is to provide such a system which operates without directly contacting the articles in the container.

A further object is to provide such a system which discriminates between the articles in the container to determine which have not been properly checked out.

It is also an object of the present invention to provide such a system which is inexpensive and easy to manufacture, maintain and operate.

SUMMARY OF THE INVENTION

It has now been found that the above and related objects of the present invention are obtained in a system for operator-unassisted checkout of randomly disposed articles in a container in a checkout area without contacting the articles in the container. Associated with each article is a respective transmitter means for transmitting product-identifying data upon actuation and then deactuating itself. Associated with the checkout area is an actuating means for actuating all of the transmitter means in the container. Also associated with the checkout area is means for receiving the transmitted product-identifying data from each article in the container in turn and identifying information regarding the articles in the container such as the total cost thereof.

In a preferred embodiment, when the respective transmitter means upon actuation is unable to successfully transmit product-identifying data to the receiver means, the respective transmitter means transmits a distress signal. The system additionally includes means associated with the checkout area for detecting each article transmitting a distress signal so that each such article can be identified for operator-assisted checkout.

In another preferred embodiment, the respective transmitter means includes means for broadcasting upon actuation a start signal of one rank and then associated signals of a different rank as the product-identifying data. The receiving means includes means for receiving one start signal and then the product-identifying data associated therewith prior to receiving another start signal. Preferably the broadcast means broadcasts unique transmitter-identifying data as part of the start signal, and the receiving means includes means for transmitting to the transmitter means identified by the unique transmitter-identifying data an acknowledgement of its receipt of the start signal. The broadcasting means broadcasts the associated product-identifying data only after receipt by the transmitter means of the acknowledgement from the receiving means. The receiving means, upon receipt of the product-identifying data broadcast by the broadcasting means, causes the transmitter means to deacuate itself if the product-identifying data is recognized and to transmit a distress signal otherwise.

BRIEF DESCRIPTION OF THE DRAWING

The above and related features, objects, and advantages of the present invention will be more fully understood by reference to the following detailed description of the presently preferred, albeit illustrative, embodiments of the present invention when taken in conjunction with the accompanying drawing wherein.

DETAILED DESCRIPTION OF PREFERRED EMBODIMENTS

Figure 1:
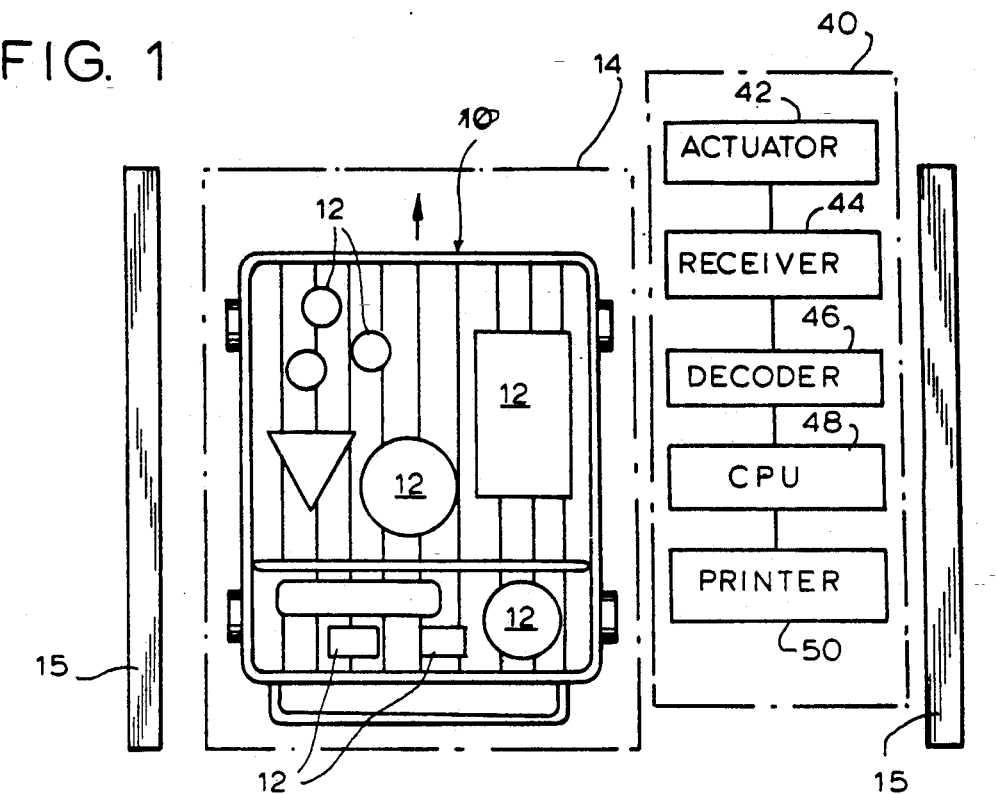
FIG. 1 is a schematic top plan view of a checkout system according to the present invention.

Referring now to the drawing, and in particular to FIG. 1 thereof, therein illustrated is a system for the operator-unassisted checkout of randomly disposed articles in a container in a checkout area, such as the checkout area of a supermarket, department store, grocery or any other retail or wholesale establishment, the checkout being performed without contacting the articles in the container. The container 10 used to carry the purchased articles 12 through the checkout area 14 may be a conventional wheeled cart (as illustrated), grocery basket, or the like suitable for the purpose—that is, large enough to carry a plurality of articles 12, but small enough to pass through the checkout area 14. Where there are a plurality of checkout areas 14, a shield 15 opaque to radio frequency transmissions is preferably disposed intermediate adjacent checkout areas. The articles 12 are randomly disposed in the container 10, as might result from a purchaser randomly placing the articles 12 in the container 10 as he/she proceeds down each supermarket aisle, without any attempt being made to order or sequentially arrange the articles within the container 10.

Figure 2:
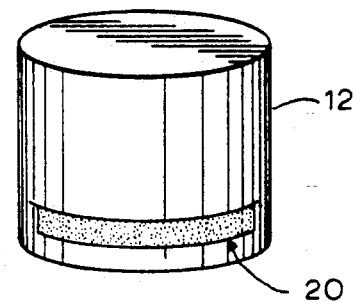
FIG. 2 is an isometric view, to an enlarged scale, of a product containing a label transmitter.

Referring now to FIG. 2 in particular, associated with each article 12 is a respective transmitter means 20 for transmitting product-identifying data upon actuation and then deactuating itself. The transmitter 20 may be in the form of a tag associated with the article and securely attached thereto to prevent accidental separation (or even unauthorized intentional separation) or in the form of a label adhered to the article 12, for example, by a pressure-sensitive adhesive, as illustrated. The transmitter 20 includes a power source 22, which may be either a small flat battery of limited life (exceeding the shelf life of the article within the supermarket) or an inductive power supply adapted to be energized by an external power supply disposed in the checkout area 14. As the maximum distance between the container 10 and the receiver in the checkout area 14 would be relatively short, a relatively low-power transmission signal suffices.

Figure 3:
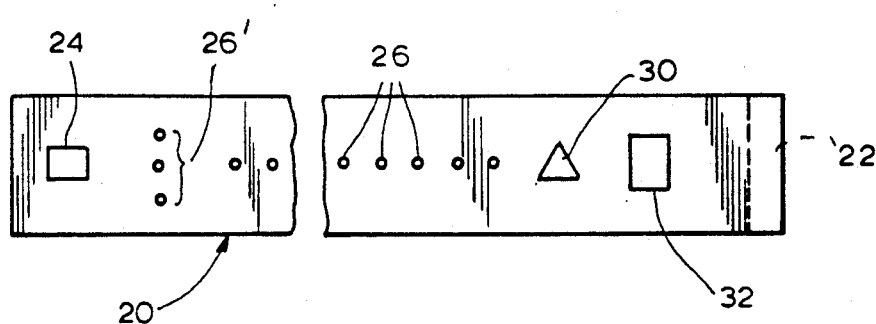
FIG. 3 is a fragmentary top plan view, to a greatly enlarged scale, of the label transmitter.

Referring now to FIG. 3 in particular, the transmitter 20 further includes a signal trigger 24 which, upon actuation by appropriate actuating means located in the checkout area 14, causes the transmitter 20 to transmit the product-identifying data. The product-identifying data is preferably represented by a string of single-digit signals 26. The product-identifying data may be a Universal Product Code (UPC), commonly used to identify a product in the United States, the European Article Number (EAN), which typically serves the same purpose in Europe, or the like.

Depending upon the particular implementation of the system, other pertinent information regarding the article may be transmitted, such as the price, volume or weight of the article. The provision of a price for the article is not recommended, however, as this would require a new transmitter to be secured to the article each time the price is changed. It is far simpler to have a computer in the checkout area determine an appropriate price for a given article from a table of article prices maintained in the computer memory and hence more easily changeable to reflect price changes. The weight of the article may be provided so that the total weight of all the articles in the container may be summed by the computer in the checkout area and compared with the actual weight of the container containing the articles minus the tare weight of the empty container. This provides an easy method of ensuring that each of the articles in the container has been accounted for and that none has passed through the checkout system undetected because of a dead, inoperable or disabled transmitter. Such security measures are well known in the art and need not be discussed in further detail herein. Additionally, the transmitter may even provide data on the volume of the article so as to enable the checkout system to provide automatically a bag, box or the like of appropriate size into which the purchased articles may be transferred for convenient transport by the purchaser out of the store.

The first or start datum 26' of the data which serves as the product-identifying data 26 will be of a different rank than the remaining data 26 so that the receiver means associated with the checkout area 14 can distinguish between the first or start signal 26' and the remaining signals 26. The distinction of rank may be provided by the use of a particular frequency, amplitude, or the like, as is well known to those skilled in the electronic arts. In FIG. 3 the start datum 26' is schematically represented by the use of three data points rather than just the one used for the remainder of the product-identifying data 26. Furthermore, it will be appreciated that the first or start signal 26' may itself not carry any useful information other than that the following signals 26 will represent the product-identifying data. It will be appreciated that once the signal trigger 24 is activated, the following single-digit signals 26 may be transmitted either in serial or parallel format.

Once the transmitter 20 has successfully transmitted all of the product identifying data 26, it reads an erase signal 30 which causes deactuation of the signal trigger 24 so that the transmitter 20 is inactivated, preferably permanently. Once the transmitter 20 of this article 12 turns itself off, the remaining articles 12 in the container 10 will be read in turn in a sequence determined by the receipt by the receiver in the checkout area 14 of the starting signals 26' therefor.

It will be appreciated that the erase signal 30 is so acted upon only after the successful reading and transmitting of the product-identifying data 26. In the event that the transmitter 20 has not been able to successfully read and transmit the product-identifying data 26 (e.g., because of damage to the transmitter 20 or the data 26 thereon), the transmitter 20, upon reading the erase signal 30, still deactuates the signal trigger 24, but at the same time (or just prior thereto) actuates transmission of a distress signal 32. (If desired, the transmitter 20 may attempt to transmit the product-identifying data 26 a predetermined number of times before actuating the distress signal 32.) When the transmitted distress signal 32 is received by the receiver in the checkout area 14, a store employee is alerted. The store employee can easily determine which of the various articles is emitting the distress signal 32 (using, for example, a proximity or strength-of-signal detector tuned to the distress signal alone) and can then remove the article 12 emitting the distress signal 32 from the container 10 and manually process the same by entering into the computer at the checkout area 14 the requisite product-identifying data and then disabling the transmitter 20 from further transmission of the distress signal 32.

Referring now to FIG. 1 again, a checkout apparatus generally designated 40 includes actuating means 42 disposed in or about the checkout area 14 to actuate all of the transmitters 20 disposed in the container 10 or otherwise passing through the checkout area 14 (even if concealed on the shopper's person). The actuating means 42 accomplishes this simply by turning on the signal trigger 24 of each transmitter 20 in its field. The checkout apparatus 40 also contains means 44 for receiving the transmitted product-identifying data 26 (either in serial or parallel format) from each article 12 in the container 10 or otherwise passing through the checkout area 14 in turn.

The receiving means 44 accepts the starting signal 26' as the start of the product-identifying data (whether or not the start signal 26' itself contains product-identifying data), and, once it receives a starting signal 26' from a given article 12, receives only the product-identifying data 26 associated therewith. Those skilled in the electronic arts will appreciate that there are a variety of different algorithms which can be used to ensure that, although a variety of different transmitters 20 on different articles 12 may be transmitting at the same time, once a particular start signal 26' is received and recognized by the receiving means 44, only the product-identifying data 26 associated therewith will be received and recognized.

If, due to any defect in the checkout apparatus 40 itself, the entire product-identifying data 26 is not received and recognized, the checkout apparatus 40 will appropriately alert store personnel, who can then make the necessary repairs or manually checkout the articles 12 in the container 10.

The checkout apparatus 40 additionally includes a decoder 46 and a computer 48 or microprocessor (e.g., a central processing unit or CPU), although the decoder 46 may also be a Part of the computer 48. The decoder 46 and computer 48 may be disposed either adjacent the checkout area 14 (like the remainder of the checkout apparatus 40) or remotely. The decoder 46 converts or translates the product-identifying data received by the receiving means 44 into a desired format (for example, a UPC or EAN code), and the computer 48 then processes this code. Where the product-identifying data includes price information, the computer 48 totals the cost of the various articles. Where the price is not included in the product-identifying data, but rather resides in an article-price table stored within the computer memory, the computer 48 locates the appropriate price information for the articles from the table and then sums the cost of the various articles. Preferably, the computer 48 includes a printer 50 which prints out a receipt itemizing each of the articles purchased (using a consumer-readable format and/or a UPC or EAN number) and its price, as well as the total price for all articles, including any applicable taxes, and optionally such other information as may be desired, such as the total number of articles purchased.

Additionally, where the product-identifying data 26 includes weight, volume or other information regarding the articles 12, the computer 48 may utilize this information appropriately. For example, where weight information is received, or the weight information is otherwise available to the computer (for example, from the article-price table in the computer memory), the computer may also total the weight of the purchased articles and compare it against the total weight of the articles in the container to determine whether in fact the checkout system has detected each and every article in the container. Where volume information is received, or the volume information is otherwise available to the computer (for example, from the article-price table in the computer memory), the computer may also direct the use or creation of an appropriately sized grocery bag or box in which the purchaser may conveniently transport the articles out of the store.

The computer 48 will preferably also evidence appropriately the presence of a distress signal 32 being transmitted—for example, by printing an appropriate symbol on the sales receipt or otherwise evidencing the fact to store personnel. If desired, egress of container 10 from the checkout area 14 may be automatically prevented by the computer until overridden by store personnel. A security tunnel may be provided immediately adjacent the egress from the store (or alternatively adjacent the egress from each checkout area) in order to detect any transmitter 20 which is still transmitting either a signal trigger 24 or a distress signal 32.

A variety of different techniques may be used to effect payment for the articles purchased. For example, payment may be made manually by the customer taking the printed sales receipt from the printer 50 and presenting it to a cashier. Alternatively, utilizing well known technology, a charge account (whether a store account or a credit card) may be debited (either automatically or manually), according to the information provided by the computer 48, or suitable automatic devices provided for receiving cash payment directly from the customer and even making change without the intervention of store personnel. Indeed, the checkout area 14 may contain means enabling the customer to indicate and select which of a variety of different payment techniques is to be used.

It is expected that the checkout system of the present invention (from the entrance of a shopping cart 10 containing 50 articles into checkout area 14 until receipt of a printed sales receipt, but prior to payment for the articles) will be approximately ten times faster than current commercially employed systems.

The customer may bag or box the purchased articles himself/herself, or store personnel may be provided for this function. In the latter case, as an additional check against error, the store personnel may count the number of articles being bagged or boxed and compare this count with a count of the number of articles purchased (as evidenced by a count number on the printed sales receipt), a discrepancy indicating that, for one reason or another, an article in the container was not deleted by the system—e.g , because of a malfunctioning transmitter or a dead power source, or because an article had its transmitter either accidentally or intentionally removed before it entered the checkout area.

Where economically feasible, redundancy may be Provided so that, for example, if the primary transmitter or power supply fails, a back-up or secondary transmitter or battery may automatically take over the function.

To use the system of the present invention, the purchaser merely takes his shopping cart 10, with the randomly disposed articles 12 therein, into the checkout area 14. The actuator 42 then activates each signal trigger 24 on each transmitter 20. Each of the transmitters 20 having an actuated signal trigger 24 immediately commences to transmit its start signal 26'. The receiving means 44 within the checkout apparatus 40 receives one start signal 26' and then transmits to the transmitter 20, identified by the unique transmitter-identifying data contained in the start signal 26', an acknowledgement that it has received the start signal 26'. Upon receipt of such acknowledgement, the transmitter 20 broadcasts the associated product-identifying data 26, which is received by the receiving means 44 and acted on by the decoder 46 and computer 48, optionally printing a receipt on printer 50. Meanwhile, having successfully transmitted all the product-identifying data 26, the transmitter 20 next reads the erase signal 30. If the transmission has been successful, the transmitter 20 immediately deactuates itself, but if the transmission has not been successful (e.g., the transmitter has not been able to read the product-identifying data 26), it first activates the distress signal 32, which is recognized by the receiving means 44 and results in store personnel being notified that assistance is required.

To summarize, the present invention provides a system for operator-unassisted checkout of randomly disposed articles in a container at a checkout area, a system operating without directly contacting the articles in the container and discriminating between the articles of the container to determine which have not been properly checked out. The system of the present invention is inexpensive and easy to manufacture, maintain and operate.

Now that the preferred embodiments of the present invention have been shown and described in detail, various modifications and improvements thereon will become readily apparent to those skilled in the art. Accordingly, the spirit and scope of the present invention are to be construed broadly and limited only by the appended claims, and not by the foregoing disclosure.

I claim:

1. A system for unattended checkout of randomly disposed articles in a container in a checkout area without moving the articles in the container relative thereto, comprising:
    (A) associated with each article, respective transmitter means for transmitting product-identifying data upon actuation and then deactuating itself;
    (B) associated with the checkout area, actuating means for actuating all of said transmitter means in the container; and
    (C) associated with the checkout area, means for receiving the transmitted product-identifying data from each article in the container in turn and identifying information regarding the articles in the container.

2. The system of claim 1 wherein, when said respective transmitter means upon actuation is unable to successfully transmit product-identifying data to said receiver means, said respective transmitter means transmits a distress signal.

3. The system of claim 2 additionally including means associated with the checkout area for detecting each article transmitting a distress signal so that each such article is identified for operator-assisted checkout.

4. The system of claim 1 wherein said respective transmitter means includes means for broadcasting upon actuation a start signal of one rank and then associated single digit signals of a different rank as the product-identifying data.

5. The system of claim 4 wherein said receiving means includes means for receiving one start signal and then the product-identifying data associated therewith prior to receiving another start signal.

6. The system of claim 4 wherein said broadcast means broadcasts unique transmitter-identifying data as part of the start signal, and said receiving means includes means for transmitting to said transmitter means identified by said unique transmitter-identifying data an acknowledgement of its receipt of the start signal.

7. The system of claim 6 wherein said broadcasting means broadcasts the associated product-identifying data only after receipt by said transmitter means of the acknowledgement from said receiving means.

8. The system of claim 7 wherein said receiving means, upon receipt of the product-identifying data broadcast by said broadcasting means, causes said transmitter means to deactuate itself if the product-identifying data is recognized and to transmit a distress signal otherwise.

9. The system of claim 1 wherein said transmitter means permanently deactutes itself.

10. A system for operator-unassisted checkout of randomly disposed articles in a container in a checkout area without contacting the articles in the container, comprising:
    (A) associated with each article, respective transmitter means for transmitting product-identifying data upon actuation and then permanently deactuating itself, and, when unable upon actuation to successfully transmit product-identifying data, for transmitting a distress signal; said respective transmitter means including means for broadcasting upon actuation a start signal of one rank including unique transmitter-identifying data and then, upon acknowledgement of the receipt thereof, associated single digit signals of a different rank as the product-identifying data;
    (B) associated with the checkout area, actuating means for actuating all of said transmitter means in the container;
    (C) associated with the checkout area, means for receiving the transmitted product-identifying data from each article in the container in turn and identifying information regarding the articles in the container; said receiving means including means for receiving one start signal, then transmitting to said transmitter means identified by said unique transmitter-identifying data in the start signal an acknowledgement of its receipt of the start signal, next receiving the product-identifying data associated therewith, and then either causing said transmitter means to permanently deactuate itself if the product-identifying data is recognized and to transmit a distress signal otherwise, prior to receiving another start signal from another transmitter means; and
    (D) associated with the checkout area, means for detecting each article transmitting a distress signal so that each such article can be identified for operator-assisted checkout.

* * * * *